United States Patent
Suenaga et al.

(10) Patent No.: US 12,282,345 B2
(45) Date of Patent: Apr. 22, 2025

(54) ELECTRONICALLY CONTROLLED REGULATOR

(71) Applicant: Nikki Co., Ltd., Kangawa-ken (JP)

(72) Inventors: Naoya Suenaga, Kanagawa-ken (JP); Shutaro Aizawa, Kanagawa-ken (JP)

(73) Assignee: Nikki Co., Ltd. (JP)

( * ) Notice: Subject to any disclaimer, the term of this patent is extended or adjusted under 35 U.S.C. 154(b) by 18 days.

(21) Appl. No.: 18/202,824

(22) Filed: May 26, 2023

(65) Prior Publication Data

US 2023/0384807 A1 Nov. 30, 2023

(30) Foreign Application Priority Data

May 30, 2022 (JP) ................................. 2022-088066

(51) Int. Cl.
 *G05D 16/20* (2006.01)
(52) U.S. Cl.
 CPC ................... *G05D 16/202* (2013.01)
(58) Field of Classification Search
 CPC .................................................. G05D 16/202
 See application file for complete search history.

(56) References Cited

U.S. PATENT DOCUMENTS

| | | | | |
|---|---|---|---|---|
| 4,791,954 A | * | 12/1988 | Hasegawa | G05D 16/202 |
| | | | | 137/489.5 |
| 4,915,083 A | * | 4/1990 | Hewette | F02M 26/72 |
| | | | | 123/568.24 |
| 4,915,349 A | * | 4/1990 | Inoue | G05D 7/0635 |
| | | | | 137/454.6 |
| 7,758,013 B2 | * | 7/2010 | Arai | F16K 31/53 |
| | | | | 251/85 |
| 9,188,237 B2 | * | 11/2015 | Dolenti | F16K 31/04 |
| 9,528,624 B2 | * | 12/2016 | Naganuma | F16K 31/046 |

FOREIGN PATENT DOCUMENTS

| | | |
|---|---|---|
| JP | S59160842 U1 | 10/1984 |
| JP | 2667114 B2 | 10/1997 |
| JP | 2007146875 A | 6/2007 |
| JP | 2011256759 A | 12/2011 |
| JP | 2019067216 A | 4/2019 |

OTHER PUBLICATIONS

English abstract for JP-2667114B2.
English abstract for JP-2011-256759.
English abstract for JP-2007-146875.
English abstract for JP-2019-067216.

* cited by examiner

*Primary Examiner* — Eric Keasel
(74) *Attorney, Agent, or Firm* — Fishman Stewart PLLC

(57) ABSTRACT

An electronically controlled regulator is disclosed. The electronically controlled regulator reduces and adjusts a pressure of a high-pressure fluid introduced through an introduction port with a pressure adjusting valve and discharges a pressure-reduced fluid having a set pressure through a discharge port. A discharge pressure adjusting mechanism includes a valve shaft moving structure that operates by driving of an electric motor and moves a valve shaft to change a distance between a valve body and a valve seat, and opens and closes the pressure adjusting valve so that the pressure of the pressure-reduced fluid maintains the set pressure while operating the valve shaft moving structure with the electric motor on the basis of a value of a pressure sensor that detects the pressure of the pressure-reduced fluid.

13 Claims, 4 Drawing Sheets

ELECTRONICALLY CONTROLLED REGULATOR

CROSS-REFERENCE TO RELATED APPLICATION

This application claims priority to Japanese App. No. JP 2022-088066 filed on May 30, 2022, the contents of which are hereby incorporated by reference in its entirety.

TECHNICAL FIELD

The present invention relates to a regulator that discharges a high-pressure fluid such as a gas fuel while reducing and adjusting the pressure to a predetermined pressure, and in particular to an electronically controlled regulator that adjusts the pressure of the fluid to be discharged by electronic control.

BACKGROUND

As a regulator that discharges a high-pressure fluid by reducing the pressure to a predetermined pressure, for example, those for gas fuel described in JP 2667114 B2 and JP 2011-256759 A are well known. This regulator has a structure including a valve shaft coaxially provided with a valve body, and a valve seat having a doughnut shape having a seat surface in which a valve hole penetrates through the center and with which the valve body comes into close contact, in which a high-pressure fluid such as CNG flowing in through an inlet of a body flows into a pressure reduction chamber through a gap between the valve body and the valve seat in an open state of the valve body, and is discharged after the pressure is adjusted.

Then, the operation that when the pressure of the fluid in the pressure reduction chamber becomes equal to or higher than a predetermined pressure, a diaphragm is pushed up by the pressure against a biasing force of a pressure adjusting spring, the valve body coupled to the diaphragm is lifted up to close the valve seat, and when the pressure of the fluid in the pressure reduction chamber becomes equal to or lower than the predetermined pressure, the diaphragm is lowered by the biasing force of the pressure adjusting spring to separate the valve body from the valve seat is repeated to adjust the fluid to a desired pressure, and the high-pressure fluid is discharged while the pressure is reduced and adjusted to a predetermined pressure by a balance between the pressure of the pressure reduction chamber and the biasing force of the pressure adjusting spring.

In addition, for example, as in regulators described in JP 2007-146875 A and JP 2019-067216 A, the regulator has a structure including a valve shaft coaxially provided with a valve body and through which a fluid can pass through, and a valve seat having a seat surface with which the valve body comes into close contact, in which the inside of a body is airtightly divided into a primary pressure chamber (pressure reduction chamber), a back pressure chamber (atmospheric pressure chamber), and a secondary pressure chamber (pressure adjusting chamber) by a piston portion integrated with the valve shaft, and a high-pressure fluid such as CNG flowing through an inlet of the body flows into the secondary pressure chamber through a passage formed in the valve shaft in an open state of the valve body, and is discharged after the pressure is adjusted.

Then, the operation that when the pressure of the fluid in the secondary pressure chamber becomes equal to or higher than a predetermined pressure, a piston is pushed up by the pressure against a biasing force of a pressure adjusting spring, the valve body coupled to the piston is lifted up to close the valve seat, and when the pressure of the fluid in the secondary pressure chamber becomes equal to or lower than the predetermined pressure, the piston is lowered by the biasing force of the pressure adjusting spring to separate the valve body from the valve seat is repeated to adjust the fluid to a desired pressure, and the high-pressure fluid is discharged while the pressure is reduced and adjusted to a predetermined pressure by a balance between the pressure of the secondary pressure chamber and the biasing force of the pressure adjusting spring.

However, in such a pressure reducing structure of the conventional regulator, since the discharge pressure of the fluid by the regulator mechanically depends on the load of the pressure adjusting spring, it is necessary to prepare the pressure adjusting spring in advance for each specified discharge pressure. In addition, in a regulator used in a fuel supply system of a vehicle, since a pressure adjusting spring is fixed to a specified set height in advance, there is a problem that a discharge pressure range and a flow rate range are mechanically limited because a pressure drop increases when an engine required flow rate is large and a pressure drop decreases when the required flow rate is small.

On the other hand, JP S59-160842 U proposes a pressure adjusting mechanism including a stepping motor that is pulse-controlled in accordance with an output signal from a pressure sensor provided in a primary-side diaphragm chamber as a biasing force adjusting means that adjusts a biasing force of a pressure adjusting spring in the primary-side diaphragm chamber in an LPG regulator including the primary-side diaphragm chamber and a secondary-side diaphragm chamber.

As described above, with the pressure adjusting mechanism including the electronically controlled stepping motor, the biasing force of the pressure adjusting spring is reduced when the pressure in the primary-side diaphragm chamber becomes higher than a preset pressure, and the biasing force of the pressure adjusting spring is increased when the pressure in the primary-side diaphragm chamber becomes lower than the preset pressure, so that the pressure in the primary-side diaphragm chamber can be maintained at a desired pressure.

However, the pressure can be adjusted and maintained to a desired pressure in this regulator only inside the primary-side diaphragm chamber, and the pressure of a fuel discharged from the secondary-side diaphragm chamber depends on the pressure adjusting spring disposed in the chamber, and therefore, it is still difficult to set various discharge pressures in one type of regulator, and in addition, the problem that the discharge pressure range and the flow rate range are mechanically limited is not solved.

SUMMARY

An object of the present invention is to solve the above problem and is to enable a regulator to automatically maintain various specified discharge pressures while being capable of coping with fluctuations in required flow rate.

Therefore, the present invention is an electronically controlled regulator including: a pressure adjusting valve including a valve shaft that is coaxially provided with a valve body and capable of reciprocating in an axial direction, a valve seat having a seat surface with which the valve body is capable of coming into contact, and a discharge pressure adjusting means that adjusts a discharge pressure of a fluid by changing a distance between the valve body and the valve seat by reciprocating the valve shaft, within a body in which an introduction port and a discharge port are formed, the regulator discharging a high-pressure fluid introduced through the introduction port through the discharge port as a pressure-reduced fluid having a set pressure by reducing and adjusting a pressure with the pressure adjusting valve, in which the discharge pressure adjusting means includes an electric motor and a valve shaft moving structure that operates by driving of the electric motor and moves the valve shaft in the axial direction to change the distance between the valve body and the valve seat, and the pressure adjusting valve is opened or closed on the basis of a value of a pressure sensor that is arranged in series or in parallel with the discharge port and detects the pressure of the pressure-reduced fluid so that the pressure of the pressure-reduced fluid maintains the set pressure while the valve shaft moving structure is operated with the electric motor.

As described above, by adopting a method in which the discharge pressure is maintained at the set pressure by performing the opening and closing operation of the valve body provided on the valve shaft while driving and controlling the electric motor on the basis of the pressure of the pressure-reduced fluid detected by the sensor instead of adjusting the discharge pressure with a pressure adjusting spring, it is possible to automatically maintain various set discharge pressures while being capable of flexibly coping with fluctuations in required flow rate.

In addition, in this regulator, the electric motor is an AC servomotor or a DC brushless motor, and the valve shaft moving structure is a feed screw formed by a combination of a trapezoidal male screw formed on an outer peripheral surface of a motion shaft having a columnar shape coaxially attached to the valve shaft and arranged movably in an axial direction and non-rotatably, and a trapezoidal female screw formed on an inner peripheral surface of a cylindrical member externally fitted to the motion shaft and meshing with the trapezoidal male screw, and when the valve shaft is moved while operating in the axial direction without rotating the trapezoidal male screw by driving the electric motor to rotate the trapezoidal female screw, the valve shaft can be moved to a valve opened position or a valve closed position in a short time without excessively enlarging the regulator and can be accurately stopped.

Additionally, when the cylindrical member formed with the trapezoidal female screw is integrated with a rotor of the electric motor, the regulator and the electric motor are configured coaxially and integrally, so that the size of the regulator including the electric motor can be compact.

Further, in the regulator including the feed screw described above, when one or both of the trapezoidal male screw and the trapezoidal female screw constituting the feed screw are made of self-lubricating resin, it is possible to maintain a smooth valve opening and closing operation at low cost for a long period of time without requiring time and effort for lubricating the meshing portion between the screws.

According to the present invention in which the discharge pressure is maintained at the set pressure by opening and closing the pressure adjusting valve while driving and controlling the electric motor on the basis of the detected discharge pressure, it is possible to automatically maintain various specified discharge pressures while being capable of coping with fluctuations in required flow rate.

DETAILED DESCRIPTION

Embodiments of the present invention will be described below with reference to the drawings. Note that, in the present invention, the self-lubricating resin refers to a resin material, such as polyacetal, monomer cast nylon, fluororesin, and ultra-high molecular weight polyethylene, which has a higher self-lubricating property on the surface than other general resin materials and thus eliminates or minimizes lubricating oil or lubricant at a sliding portion and a friction portion between members.

Figure 1:
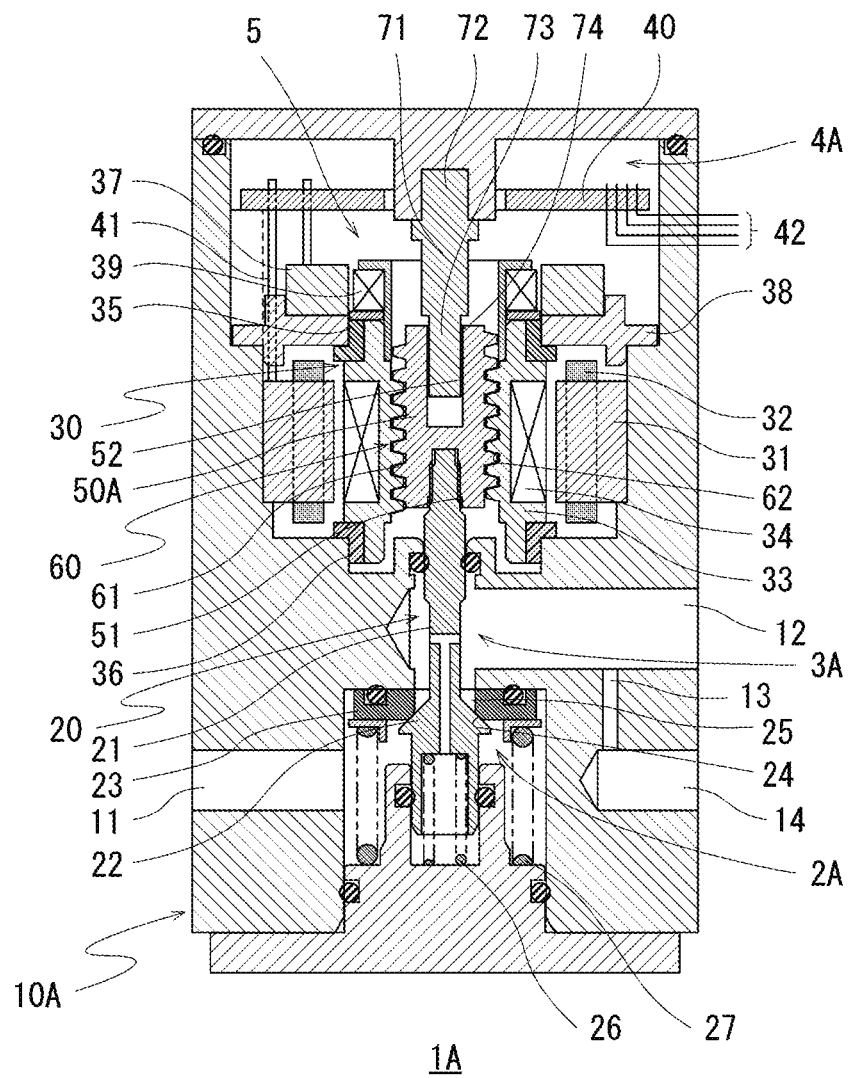
FIG. 1 is a longitudinal sectional view illustrating a valve closed state of an electronically controlled regulator according to a first embodiment of the present invention.
Figure 2:
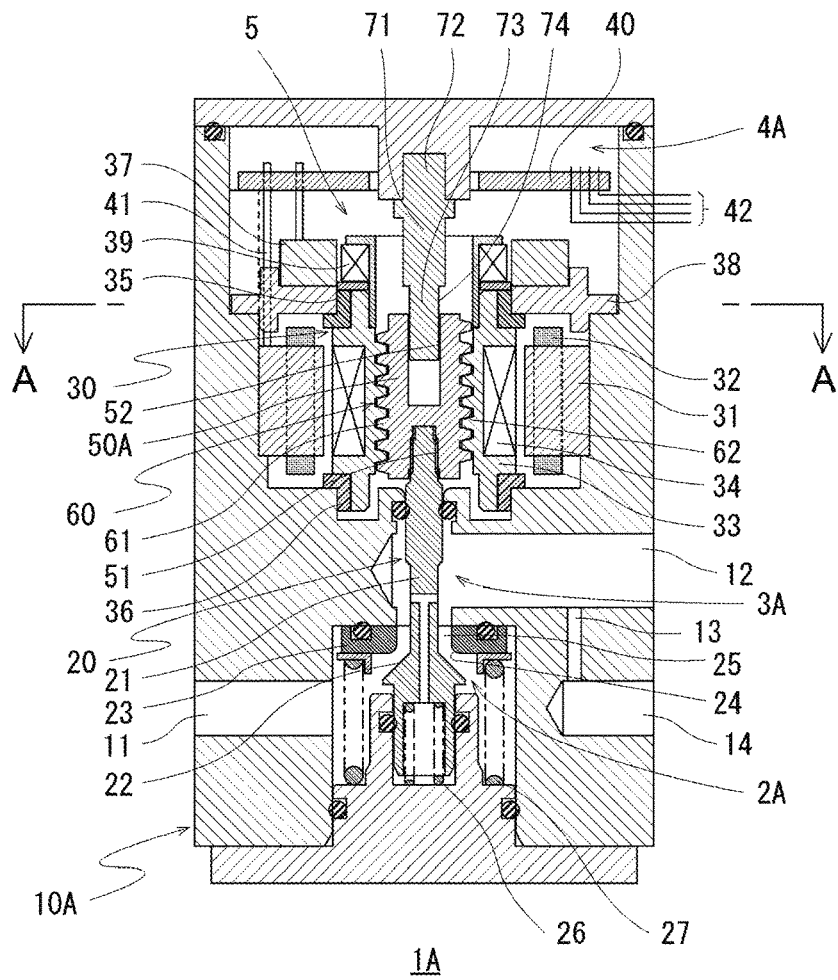
FIG. 2 is a longitudinal sectional view illustrating a valve opened state of the electronically controlled regulator of FIG. 1.

FIG. 1 illustrates a valve closed state of an electronically controlled regulator 1A according to a first embodiment of the present invention, and FIG. 2 illustrates a valve opened state. The electronically controlled regulator 1A is assumed to be used as a pressure reducing means that delivers gas fuel, which is a high-pressure fluid, while reducing the pressure to a predetermined pressure mainly in a supply system for gas fuel or the like.

When the configuration is roughly described, the inside of a body 10A made of metal and formed in a columnar shape includes a high-pressure portion 2A from an introduction port 11 through which a high-pressure fluid is introduced to a pressure adjusting valve 20, a discharge portion 3A from the pressure adjusting valve 20 to a discharge port 12 through which a pressure-reduced fluid is discharged, and a pressure control portion 4A for reducing and adjusting the pressure of the pressure-reduced fluid discharged by operating the pressure adjusting valve 20 to a set pressure.

The pressure adjusting valve 20 includes a valve shaft 21 that is coaxially provided with a valve body 22 having an umbrella shape and capable of reciprocating in an axial direction, a valve seat 23 having a doughnut shape that has a seat surface 24 with which the valve body 22 is capable of coming into close contact and in which a valve hole 25 is formed at the center, and a discharge pressure adjusting means that adjusts a discharge pressure by changing a distance between the valve body 22 and the valve seat 23 by reciprocating the valve shaft 21.

The discharge pressure adjusting means includes an electric motor 30, a driver 40 that drives and controls the electric motor 30, and a motion shaft 50A that is coaxially coupled to the valve shaft 21 by inserting a distal end side of the valve shaft 21 into a coupling hole 51 formed at an end, and automatically adjusts the pressure of the pressure-reduced fluid to be discharged to be equal to the set pressure while changing an opening area by reciprocating the valve body 22 of the valve shaft 21 arranged below the discharge pressure adjusting means in the axial direction between a valve closed position (FIG. 1) where the valve body 22 and the seat surface 24 are in close contact with each other and a valve opened position (FIG. 2) where the valve body 22 and the seat surface 24 are separated from each other by driving of the electronically controlled electric motor 30 with respect to the seat surface 24 of the valve seat 23, and this point is the largest characteristic part of the present invention.

The discharge pressure adjusting means includes a valve shaft moving structure to be described below that is operated by driving of the electric motor 30 to move the valve shaft 21 in the axial direction, and opens and closes the pressure adjusting valve 20 so as to maintain the pressure of the pressure-reduced fluid to be discharged at the set pressure while operating the valve shaft moving structure with the electric motor 30 on the basis of a value of a pressure sensor (not illustrated) that detects the pressure of the pressure-reduced fluid in a pressure sensor installation portion 14 connected to the discharge port 12 on the downstream side of the valve hole 25 through a communication hole 13.

Note that the installation location of the pressure sensor is not limited to the inside of the pressure sensor installation portion 14, and the pressure sensor may be provided at any location on a path through which the pressure-reduced fluid is delivered as long as the pressure sensor can be arranged in series or in parallel with the discharge port 12 to detect the discharge pressure.

As described above, with the electronically controlled regulator 1A of the present embodiment, by adopting a method of adjusting the discharge pressure by driving and controlling the electric motor 30 on the basis of the discharge pressure detected by the pressure sensor and reciprocating the valve shaft 21 in the axial direction to open and close the pressure adjusting valve 20 (change the opening area) instead of adjusting the discharge pressure with a pressure adjusting spring as in the conventional regulator, it is possible to cope with various required discharge pressures and required flow rates with one product without requiring replacement of parts while solving the problem of the conventional regulator that the a pressure drop increases when the required flow rate is large and the pressure drop decreases when the required flow rate is small and the discharge pressure range and the required flow rate range are mechanically limited.

Note that, in the present embodiment, an AC servomotor having excellent controllability is used as the electric motor 30 constituting a part of the discharge pressure adjusting means, and quick and accurate positioning of the rotation angle can be achieved by the drive control by the driver 40, but a DC brushless motor may be used instead of the AC servomotor.

In addition, in the electronically controlled regulator 1A of the present embodiment, the valve shaft moving structure is a feed screw 60 including a combination of a trapezoidal male screw 61 formed on an outer peripheral surface of the motion shaft 50A having a columnar shape provided on the distal end side of the valve shaft 21 and a trapezoidal female screw 62 formed on an inner peripheral surface of a rotor 33, which is a cylindrical member, constituting a part of the electric motor 30 and meshing with the trapezoidal male screw 61, and is configured such that the trapezoidal female screw 62 integrated with the inner peripheral surface side of the rotor 33 rotates around the trapezoidal male screw 61 by driving of the electric motor 30.

Regarding the feed screw 60, one or both of the trapezoidal male screw 61 and the trapezoidal female screw 62 constituting the feed screw 60 are preferably formed of a self-lubricating resin material. This makes it easy to maintain a smooth valve opening and closing operation at low cost for a long period of time without requiring lubrication of lubricating oil at the meshing portion between the trapezoidal male screw 61 and the trapezoidal female screw 62.

Then, the motion shaft 50A has a structure of having an insertion hole 52 having a planar portion on an inner peripheral surface at an end portion on a side opposite to the coupling hole 51, and a detent shaft 71 having a proximal end 72 fixed to the body 10A and a planar portion 74 formed on an outer peripheral surface of a distal end 73 is slidably inserted into the insertion hole 52 in an axial direction (see FIG. 3), and the planar portions are brought into close contact with each other to regulate and convert a rotary operation of the motion shaft 50A into a linear operation in the axial direction, thereby moving the valve shaft 21 coupled through the coupling hole 51.

In addition, by making the seat diameter by the seat surface 24 of the valve seat 23 and the effective diameter of the valve body 22 substantially the same, it is easy to achieve a reduction in size of the electric motor 30 to be used and downsizing of the electronically controlled regulator 1A.

The configuration of the pressure control portion 4A in the electronically controlled regulator 1A will be described in more detail.

As described above, an AC servomotor having excellent controllability is used as the electric motor 30 housed in a storage chamber 5 formed on an upper side of the body 10A. A plurality of stators 31 supporting windings 32 in a wound state is disposed on an inner peripheral side of the storage chamber 5, and the rotor 33 having a substantially cylindrical shape on an outer peripheral side of which a plurality of magnets 34 is disposed to face the respective stators 31 is rotatably disposed with a central axis thereof being aligned with the valve shaft 21.

The rotor 33 is pivotally supported with slide bearings 35 and 36 disposed on both upper and lower end sides thereof, and is rotated by a magnetic force generated by energizing the windings 32 facing the magnets 34 to drive the electric motor 30. Note that, by using self-lubricating resin having excellent surface lubricating performance as a material of the slide bearings 35 and 36, smooth rotation of the rotor 33 is enabled for a long period of time without requiring regular lubrication of a friction portion thereof.

A cover 38 for axial alignment of the rotor 33 and attachment of a magnetic pole position sensor 37 is disposed above the stators 31 and a magnet 39 is disposed above the rotor 33, and the rotational position of the rotor 33 can be detected with the magnetic pole position sensor 37 together with a magnetic pole generated by a current flowing through the stators 31.

In addition, the driver 40 for driving the motor is disposed above the magnetic pole position sensor 37, the driver 40 is connected to the windings 32 by terminals 41, and external terminals 42 for external input are exposed to the outside of the body 10A.

Figure 3:
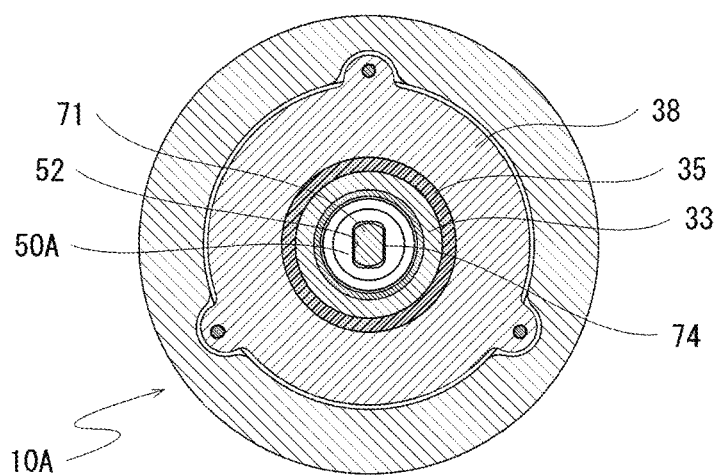
FIG. 3 is a sectional view taken along line A-A of FIG. 2.

Next, the operation according to the present embodiment will be described with reference to the sectional views of FIGS. 1 to 3 and the functional block diagram of FIG. 4.

As illustrated in FIG. 1, in the initial state, the valve shaft 21 is pushed up by a spring 26 disposed on the proximal end side, and the valve body 22 is closed while being in close contact with the seat surface 24 of the valve seat 23. Note that reference numeral 27 denotes a spring that presses and holds the valve seat 23.

Figure 4:
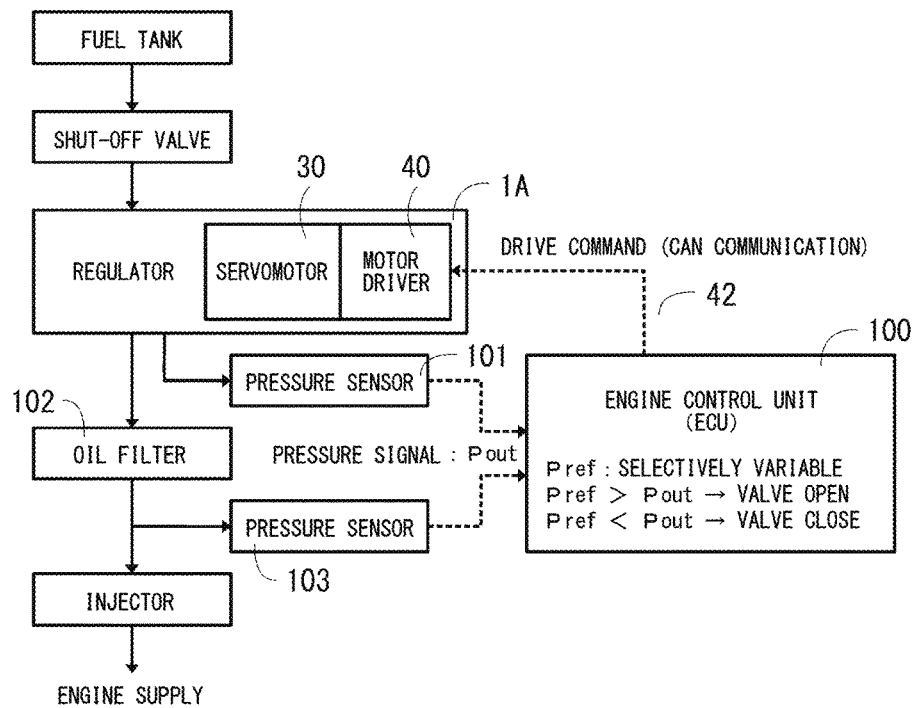
FIG. 4 is a functional block diagram of a fuel supply system of an engine including the electronically controlled regulator of FIG. 1.

Then, when the electronically controlled regulator 1A is used, as illustrated in FIG. 4, a target pressure (Pref) command is input from an engine control unit 100, which is an electronic control means, to the driver 40 via the external terminals 42. At this time, when the relationship between the target pressure (Pref) and a discharge pressure value (Pout) detected by a pressure sensor 101 is Pref>Pout, a current is applied to the windings 32 of the stators 31, and the rotor 33 rotates in a direction of pushing down the motion shaft 50A, so that the valve body 22 of the valve shaft 21 is also pushed down accordingly, and the valve opened state is provided as illustrated in FIG. 2.

On the contrary, when the relationship between the target pressure (Pref) and the discharge pressure value (Pout) is Pref<Pout, the rotor 33 rotates in a direction of pushing up the motion shaft 50A, the valve body 22 of the valve shaft 21 is also pushed up accordingly, and the valve closed state is provided as illustrated in FIG. 1.

The discharge pressure can be maintained at the specified target pressure by opening and closing the pressure adjusting valve 20 (changing the opening area) by executing the above control. In addition, the discharge pressure can be freely changed by inputting a target set pressure according to the use condition of the regulator.

Note that, as illustrated in FIG. 4, a pressure sensor 103 that detects the pressure of the fluid that has passed through an oil filter 102 may be replaced with or used in combination with the pressure sensor 101.

Figure 5:
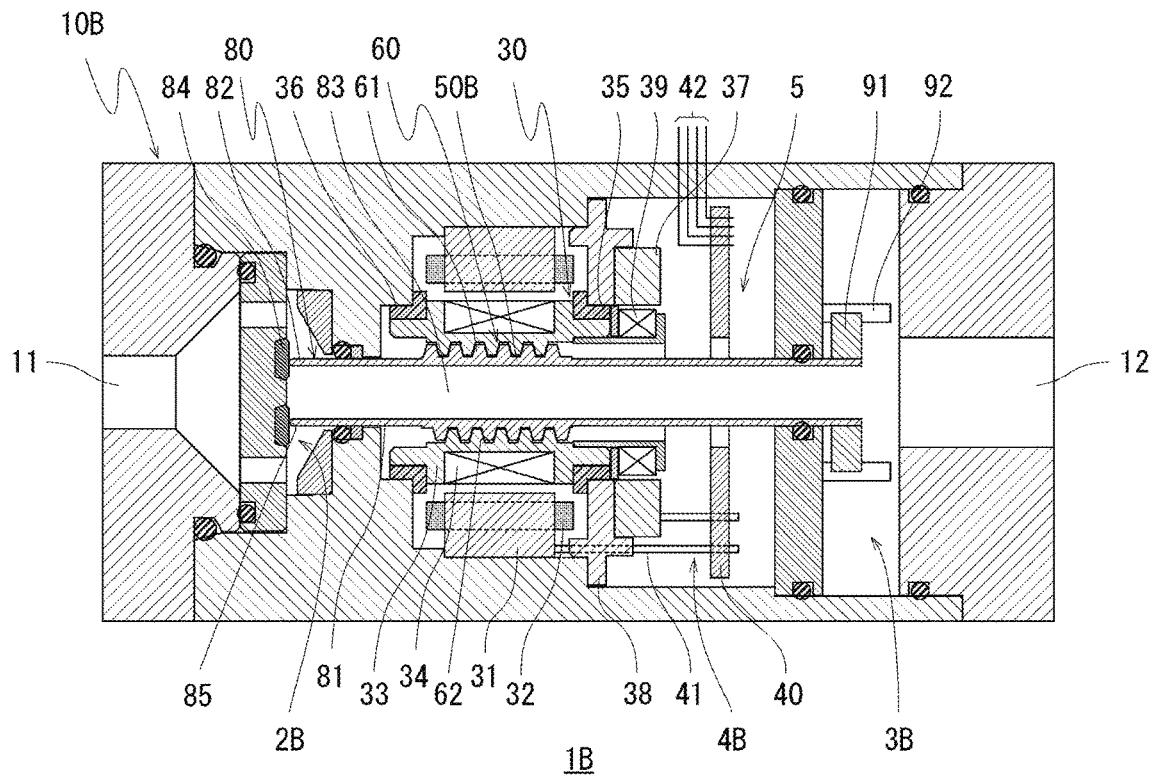
FIG. 5 is a longitudinal sectional view illustrating a valve opened state of an electronically controlled regulator according to a second embodiment of the present invention.
Figure 6:
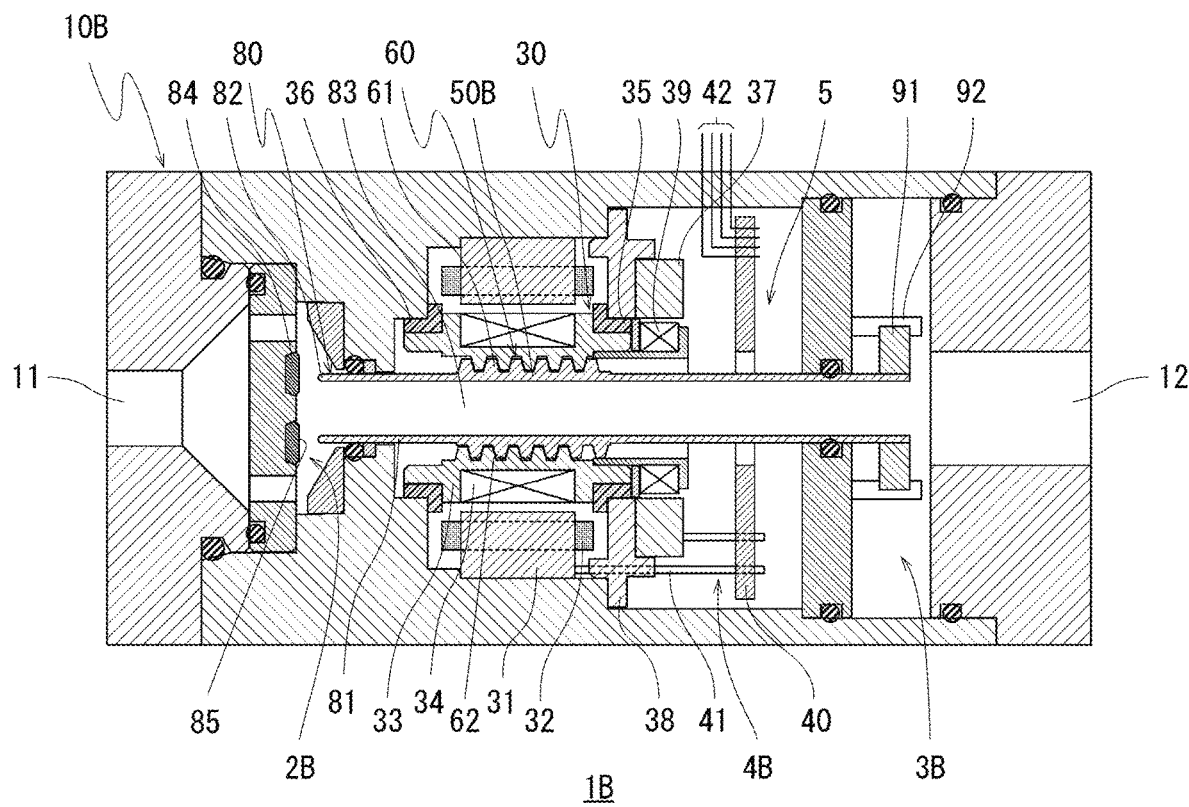
FIG. 6 is a longitudinal sectional view illustrating a valve closed state of the electronically controlled regulator of FIG. 5.

FIG. 5 illustrates a valve closed state of an electronically controlled regulator 1B according to a second embodiment of the present invention, and FIG. 6 illustrates a valve opened state. The electronically controlled regulator 1B is, similarly to the electronically controlled regulator 1A, assumed to be used as a pressure reducing means that delivers gas fuel, which is a high-pressure fluid, while reducing the pressure to a predetermined pressure mainly in a supply system for gas fuel or the like.

Similarly to the electronically controlled regulator 1A, when the configuration is roughly described, the inside of a body 10B made of metal and formed in a columnar shape includes a high-pressure portion 2B from an introduction port 11 through which a high-pressure fluid is introduced to a pressure adjusting valve 80, a discharge portion 3B from the pressure adjusting valve 80 to a discharge port 12 through which a pressure-reduced fluid is discharged, and a pressure control portion 4B for reducing and adjusting the pressure of the pressure-reduced fluid discharged by operating the pressure adjusting valve 80 to a set pressure.

The pressure adjusting valve 80 includes a valve shaft 81 having a cylindrical shape that is coaxially provided with a valve body 82 having an annular shape, capable of reciprocating in an axial direction, and has a passage 83 through which a fluid can pass through, a valve seat 84 having an annular shape that has a seat surface 85 with which the valve body 82 is capable of coming into close contact, and a discharge pressure adjusting means that adjusts a discharge pressure of the fluid by changing a distance between the valve body 82 and the valve seat 84 by reciprocating the valve shaft 81.

Similarly to the electronically controlled regulator 1A, the discharge pressure adjusting means includes an electric motor 30, a driver 40 that drives and controls the electric motor 30, and a motion shaft 50B integrally formed with the valve shaft 81, and automatically adjusts the pressure of the pressure-reduced fluid to be discharged to be equal to the set pressure while changing an opening area by reciprocating the valve body 82 of the valve shaft 81 arranged through the discharge pressure adjusting means in the axial direction between a valve closed position (FIG. 5) where the valve body 82 and the seat surface 85 are in close contact with each other and a valve opened position (FIG. 6) where the valve body 82 and the seat surface 85 are separated from each other by driving of the electronically controlled electric motor 30 with respect to the seat surface 85 of the valve seat 84.

The discharge pressure adjusting means includes a valve shaft moving structure to be described below that is operated by driving of the electric motor 30 to move the valve shaft 81 in the axial direction, and opens and closes the pressure adjusting valve 80 so as to maintain the pressure of the pressure-reduced fluid to be discharged at the set pressure while operating the valve shaft moving structure with the electric motor 30 on the basis of a value of a pressure sensor (not illustrated) that detects the discharge pressure on a path through which the pressure-reduced fluid is delivered on the downstream side of the valve shaft 81 (after passing through the passage 83).

The valve shaft moving structure of the electronically controlled regulator 1B of the present embodiment is a feed screw 60 including a combination of a trapezoidal male screw 61 formed on an outer peripheral surface of the motion shaft 50B having a columnar shape integrally formed on an outer periphery of the valve shaft 81 and a trapezoidal female screw 62 formed on an inner peripheral surface of a rotor 33, which is a cylindrical member, constituting a part of the electric motor 30 and meshing with the trapezoidal male screw 61, and is configured such that the trapezoidal female screw 62 integrated with the inner peripheral surface side of the rotor 33 rotates around the trapezoidal male screw 61 by driving of the electric motor 30.

Then, the valve shaft 81 integrated with the motion shaft 50B has a structure including detent protrusions 91 protruding outward in a circumferential direction at an end on a side opposite to the valve body 82 and detent guides 92 protruding to the body 10B side so as to sandwich the detent protrusions 91, and the detent protrusions 91 and the detent guides 92 come into contact with each other to regulate and convert a rotary operation of the motion shaft 50B into a linear operation in the axial direction, thereby moving the valve shaft 81 integrated with the motion shaft 50B.

In addition, by making the seat diameter by the seat surface 85 of the valve seat 84 and the effective diameter of the valve body 82 substantially the same, it is easy to achieve a reduction in size of the electric motor 30 to be used and downsizing of the electronically controlled regulator 1B.

As described above, with the electronically controlled regulator 1B of the present embodiment, unlike the conventional regulator, the discharge pressure is not adjusted by using the balance between the load applied to a pipe-shaped valve shaft and the load of a pressure adjusting spring disposed on the opposite side via the valve shaft, similarly to the above-described electronically controlled regulator 1A, by adopting a method of adjusting the discharge pressure by driving and controlling the electric motor 30 on the basis of the discharge pressure detected by the pressure sensor and reciprocating the valve shaft 81 in the axial direction to open and close the pressure adjusting valve 80 (change the opening area), it is possible to cope with various required discharge pressures and required flow rates with one product without requiring replacement of parts while solving the problem of the conventional regulator that the a pressure drop increases when the required flow rate is large and the pressure drop decreases when the required flow rate is small and the discharge pressure range and the required flow rate range are mechanically limited.

The electronically controlled regulator 1A and the electronically controlled regulator 1B have a relationship in which the structures of the valve body and the valve shaft are reversed, but the excellent effect of the present invention can be obtained in both embodiments.

As described above, according to the present invention, it is possible to enable a regulator to automatically maintain various specified discharge pressures while being capable of coping with fluctuations in required flow rate.

What is claimed is:

1. An electronically controlled regulator comprising:
a pressure adjusting valve including a valve shaft that is coaxially provided with a valve body and capable of reciprocating in an axial direction, a valve seat having a seat surface with which the valve body is capable of coming into contact, and a discharge pressure adjusting mechanism that adjusts a discharge pressure of a gas fuel by changing a distance between the valve body and the valve seat by reciprocating the valve shaft, within a body in which an introduction port and a discharge port are provided, the regulator discharging the gas fuel introduced through the introduction port through the discharge port having a set pressure by reducing and adjusting a pressure with the pressure adjusting valve,
wherein the discharge pressure adjusting mechanism includes an electric motor and a valve shaft moving structure that operates by driving of the electric motor and moves the valve shaft in the axial direction to change the distance between the valve body and the valve seat, and the pressure adjusting valve is opened or closed on a basis of a value of a pressure sensor that is arranged in series or in parallel with the discharge port and detects the pressure of the gas fuel that has passed through the pressure adjusting valve so that the pressure of the gas fuel that has passed through the pressure adjusting valve maintains the set pressure while the valve shaft moving structure is operated with the electric motor,
wherein the valve shaft moving structure is a feed screw provided by a combination of a trapezoidal male screw disposed on an outer peripheral surface of a motion shaft having a columnar shape coaxially attached to the valve shaft and arranged movably in an axial direction and non-rotatably, and a trapezoidal female screw disposed on an inner peripheral surface of a cylindrical member externally fitted to the motion shaft and meshing with the trapezoidal male screw,
wherein the valve shaft is moved while operating in the axial direction without rotating the trapezoidal male screw by driving the electric motor to rotate the trapezoidal female screw, and
wherein one or both of the trapezoidal male screw and the trapezoidal female screw are composed of self-lubricating resin.

2. The electronically controlled regulator according to claim 1, wherein the cylindrical member on which the trapezoidal female screw is disposed is integrated with a rotor of the electric motor.

3. The electronically controlled regulator according to claim 1, wherein the electric motor is an AC servomotor.

4. The electronically controlled regulator according to claim 1, wherein the electric motor is a DC brushless motor.

5. An electronically controlled regulator comprising:
a pressure adjusting valve including a valve shaft that is coaxially provided with a valve body and capable of reciprocating in an axial direction, a valve seat having a seat surface with which the valve body is capable of coming into contact, and a discharge pressure adjusting mechanism that adjusts a discharge pressure of a gas fuel by changing a distance between the valve body and the valve seat by reciprocating the valve shaft, within a body in which an introduction port and a discharge port are provided, the regulator discharging the gas fuel introduced through the introduction port through the discharge port having a set pressure by reducing and adjusting a pressure with the pressure adjusting valve,
wherein the discharge pressure adjusting mechanism includes an electric motor and a valve shaft moving structure that operates by driving of the electric motor and moves the valve shaft in the axial direction to change the distance between the valve body and the valve seat, and the pressure adjusting valve is opened or closed on a basis of a value of a pressure sensor that is arranged in series or in parallel with the discharge port and detects the pressure of the gas fuel that has passed through the pressure adjusting valve so that the pressure of the gas fuel that has passed through the pressure adjusting valve maintains the set pressure while the valve shaft moving structure is operated with the electric motor,
wherein the valve shaft having a cylindrical shape that is coaxially provided with the valve body having an annular shape, capable of reciprocating in an axial direction, and has a passage through which the gas fuel can pass through.

6. The electronically controlled regulator according to claim 5, wherein:
the valve shaft moving structure is a feed screw provided by a combination of a trapezoidal male screw disposed on an outer peripheral surface of a motion shaft having a columnar shape coaxially attached to the valve shaft and arranged movably in an axial direction and non-rotatably, and a trapezoidal female screw disposed on an inner peripheral surface of a cylindrical member externally fitted to the motion shaft and meshing with the trapezoidal male screw, and the valve shaft is moved while operating in the axial direction without rotating the trapezoidal male screw by driving the electric motor to rotate the trapezoidal female screw.

7. The electronically controlled regulator according to claim 6, wherein the cylindrical member on which the trapezoidal female screw is disposed is integrated with a rotor of the electric motor.

8. The electronically controlled regulator according to claim 6, wherein one or both of the trapezoidal male screw and the trapezoidal female screw are composed of self-lubricating resin.

9. The electronically controlled regulator according to claim 5, wherein the cylindrical member on which the trapezoidal female screw is disposed is integrated with a rotor of the electric motor.

10. The electronically controlled regulator according to claim 9, wherein one or both of the trapezoidal male screw and the trapezoidal female screw are composed of self-lubricating resin.

11. The electronically controlled regulator according to claim 5, wherein one or both of the trapezoidal male screw and the trapezoidal female screw are composed of self-lubricating resin.

12. The electronically controlled regulator according to claim 5, wherein the electric motor is an AC servomotor.

13. The electronically controlled regulator according to claim 5, wherein the electric motor is a DC brushless motor.

* * * * *